(12) United States Patent
Hodgekins et al.

(10) Patent No.: US 7,452,472 B2
(45) Date of Patent: Nov. 18, 2008

(54) GREASE INTERCEPTOR HAVING A GREASE REMOVAL DEVICE

(75) Inventors: Barry Hodgekins, LaPorte, IN (US); Craig Swider, Michigan City, IN (US); Ronghua Zhou, deceased, late of Philadelphia PA (US); by Wenwei Wu, legal representative, Las Vegas, NV (US); B. Scott Holloway, Philadelphia, PA (US)

(73) Assignee: Josam Company, Philadelphia, PA (US)

( * ) Notice: Subject to any disclaimer, the term of this patent is extended or adjusted under 35 U.S.C. 154(b) by 0 days.

(21) Appl. No.: 11/761,969

(22) Filed: Jun. 12, 2007
(Under 37 CFR 1.47)

(65) Prior Publication Data
US 2008/0061012 A1  Mar. 13, 2008

Related U.S. Application Data

(60) Provisional application No. 60/812,856, filed on Jun. 12, 2006.

(51) Int. Cl.
*B01D 17/025* (2006.01)

(52) U.S. Cl. .................. 210/800; 210/138; 210/521; 210/523; 210/540

(58) Field of Classification Search .......... 210/800, 210/803, 138, 521, 523, 538, 540
See application file for complete search history.

(56) References Cited

U.S. PATENT DOCUMENTS

| 911,314 | A | * | 2/1909 | Maranville | 210/540 |
|---|---|---|---|---|---|
| 1,176,775 | A | * | 3/1916 | Morris | 210/521 |
| 1,200,951 | A | * | 10/1916 | Kelly | 210/540 |
| 4,137,173 | A | | 1/1979 | Jarvis et al. | |
| 5,405,538 | A | * | 4/1995 | Batten | 210/800 |
| 5,492,619 | A | * | 2/1996 | Batten | 210/521 |
| 5,705,055 | A | * | 1/1998 | Holloway et al. | 210/540 |
| 5,993,646 | A | * | 11/1999 | Powers | 210/538 |
| 6,517,715 | B1 | * | 2/2003 | Batten et al. | 210/540 |
| 6,800,195 | B1 | * | 10/2004 | Batten et al. | 210/138 |
| 2004/0195186 | A1 | | 10/2004 | Nicolia et al. | |
| 2005/0236307 | A1 | | 10/2005 | Mazurek et al. | |

OTHER PUBLICATIONS

International Search Report and Written Opinion for corresponding PCT Application No. PCT/US07/71032, dated Dec. 5, 2007.

* cited by examiner

*Primary Examiner*—Christopher Upton
(74) *Attorney, Agent, or Firm*—Christie, Parker & Hale, LLP

(57) ABSTRACT

The present invention relates to the removal of grease collected in a hydro-mechanical grease interceptor via a pump which may be activated by a programmable timer. In an embodiment, a hydro-mechanical grease interceptor includes a tank having a tank inlet and a tank outlet; a tray positioned inside the tank; and a pump located inside the tank, the pump having a pump inlet and a pump outlet, wherein the pump inlet is located within the tray at a level below the tank outlet. The interceptor may include a timer coupled to the pump to control operation of the pump.

20 Claims, 6 Drawing Sheets

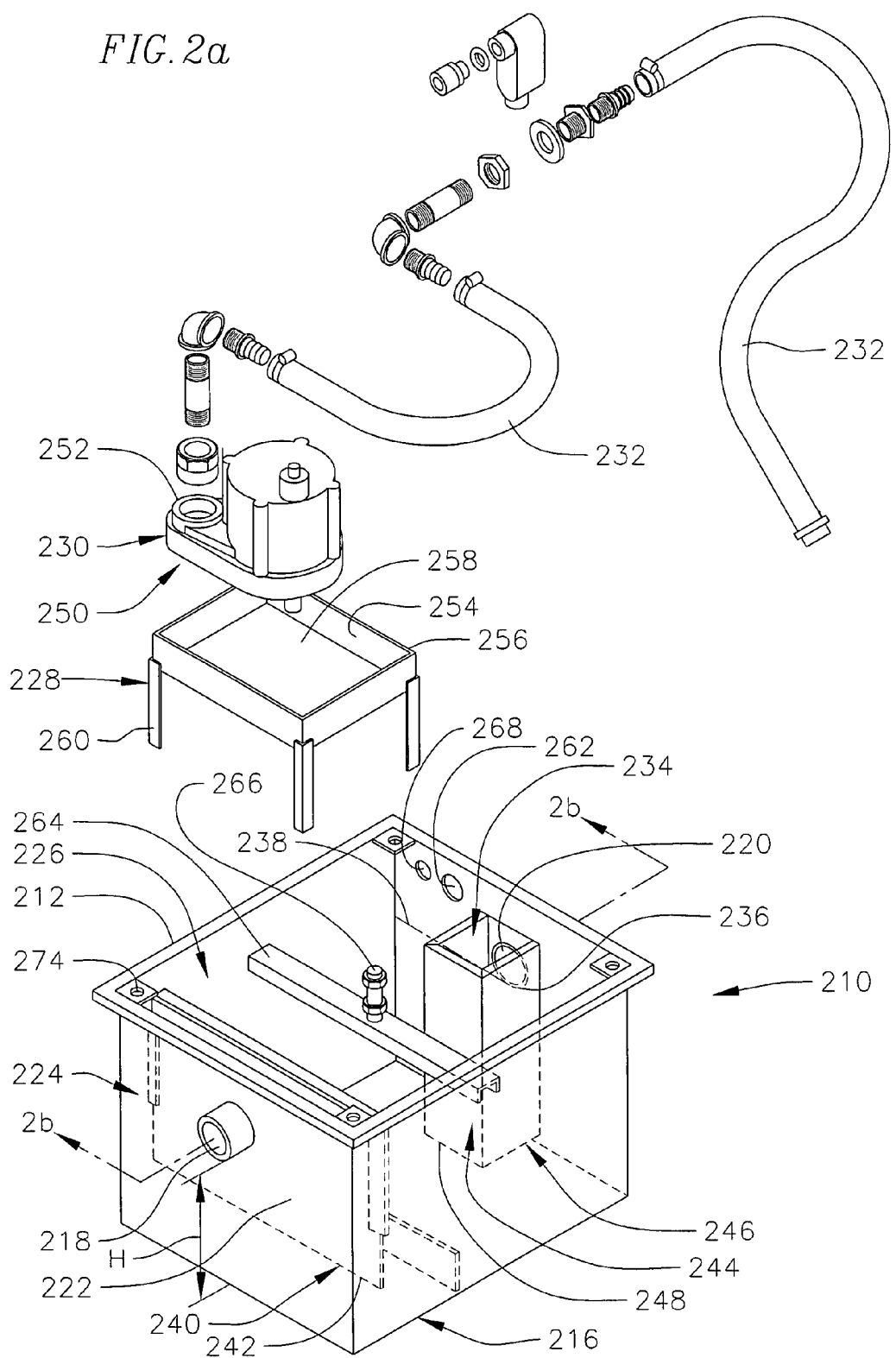

GREASE INTERCEPTOR HAVING A GREASE REMOVAL DEVICE

CROSS-REFERENCE TO RELATED APPLICATION(S)

This Application claims priority to and the benefit of U.S. Patent Application No. 60/812,856, filed Jun. 12, 2006, the entire content of which is expressly incorporated herein by reference.

FIELD OF THE INVENTION

The present invention relates to the removal of grease collected in a hydro-mechanical grease interceptor via a pump, which may be activated by a programmable timer.

BACKGROUND OF THE INVENTION

EPA (Environmental Protection Agency) and health regulations require restaurants and other food service providers to separate grease from their drainage water in order to safely contain and discard fats, oils, and grease. If such grease is not removed from the restaurant's drainage water, the grease can clog water pipes and drains and create a health hazard. Prior art grease removal devices utilize large tanks in which the grease separates and rises to the top of the drainage water. The grease removal device then uses a large external pump to pump the grease from drainage water or a skimming mechanism to skim the grease off the top of the water.

These prior art devices can include expensive components, such as large external pumps and skimmers and internal heaters, which are costly to manufacture and maintain. When these complicated devices fail, grease flows with the water through the outlet instead of being separated and removed. Accordingly, it is desirable to provide an efficient and cost-effective grease removal device.

SUMMARY

The present invention relates to the removal of grease collected in a hydro-mechanical interceptor via a pump, which may be activated by a programmable timer. In one embodiment, a hydro-mechanical grease interceptor includes a tank having a tank inlet and a tank outlet; a tray positioned inside the tank; and a pump located inside the tank, the pump having a pump inlet and a pump outlet, wherein the pump inlet is located within the tray at a level below the tank outlet.

In another embodiment, a hydro-mechanical grease interceptor includes a tank comprising a tank inlet and a tank outlet; a baffle positioned in the tank between the tank inlet and the tank outlet; a flow passage below the baffle; an elevated tray positioned in the tank between the baffle and the tank outlet; a pump supported by the elevated tray, the pump having a pump inlet below a pump outlet, wherein the pump inlet is positioned by the elevated tray below the tank outlet; a timer coupled to the pump and programmable to operate the pump at timed intervals; a reclaim tank; and an evacuation hose connecting the reclaim tank to the pump outlet.

In another embodiment, a hydro-mechanical grease interceptor for collecting grease includes an inlet chamber; a separation chamber separated from the inlet chamber by a baffle; an elevated tray positioned in the separation chamber; a pump supported by the elevated tray; and a timer programmable to operate the pump at programmed intervals, wherein the pump is positionable in the elevated tray to draw such grease upward from the elevated tray.

In another embodiment, a method of evacuating grease from a hydro-mechanical grease interceptor includes providing a hydro-mechanical grease interceptor having a chamber; passing grease-containing water into the chamber; activating a pump after a preselected period of time to draw grease into a tray within the chamber and to evacuate the grease to a reclaim tank; continuing to pass grease-containing water into the interceptor; and periodically re-activating the pump.

BRIEF DESCRIPTION OF THE DRAWINGS

These and other features of the present invention will become appreciated as the same become better understood with reference to the specification, claims and appended drawings wherein:

FIG. 2a is an exploded view of a hydro-mechanical grease interceptor according to an exemplary embodiment of the invention;

FIG. 2b is a partial vertical cross-sectional view of the hydro-mechanical grease interceptor of FIG. 2a taken along the line 2b-2b of FIG. 2a;

DETAILED DESCRIPTION

Figure 1:
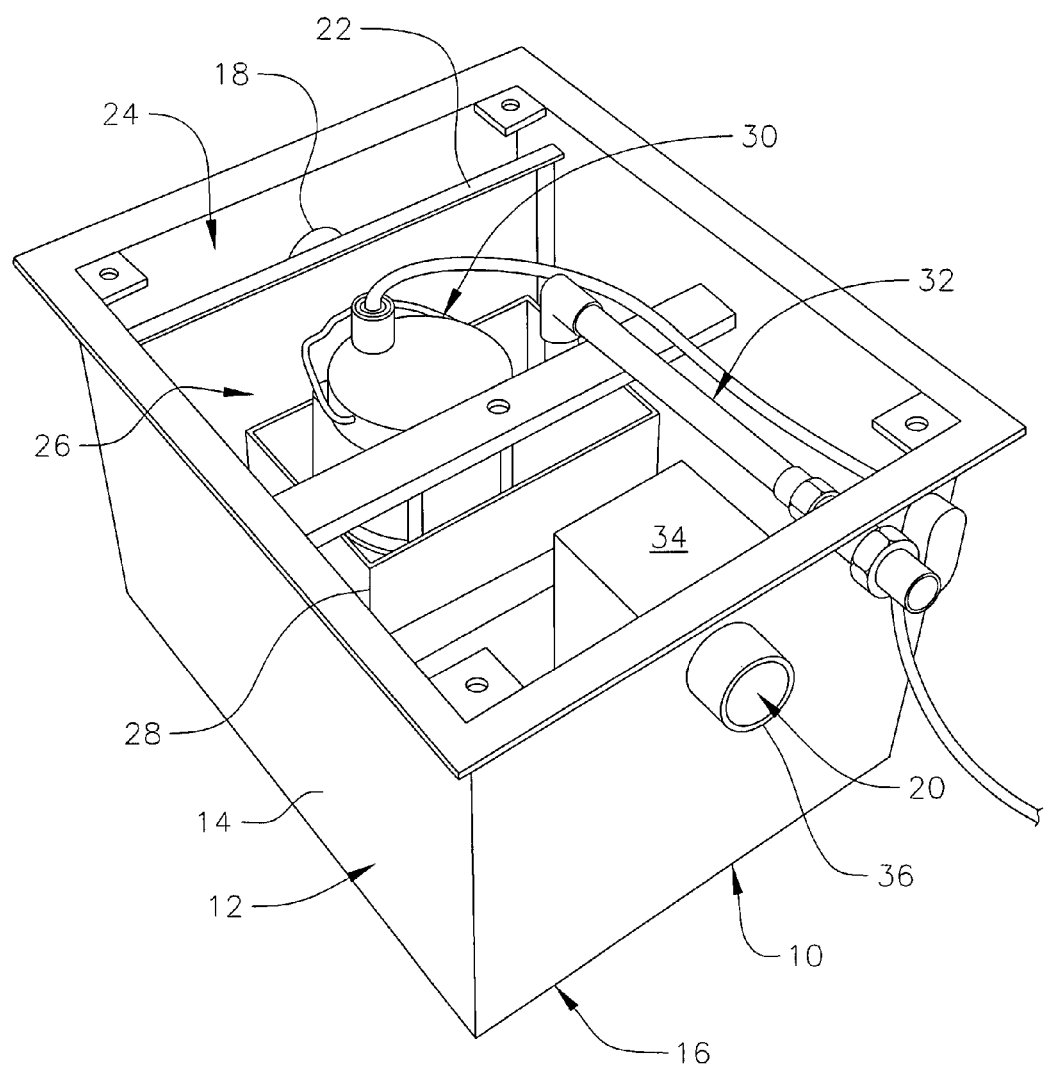
FIG. 1 is a perspective view of a hydro-mechanical grease interceptor according to an exemplary embodiment of the invention.

The detailed description set forth below in connection with the appended drawings is intended as a description of the presently preferred embodiments of a hydro-mechanical grease interceptor provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The present invention relates to the removal of grease collected in a grease interceptor via a pump which may be activated by a programmable timer. In an exemplary embodiment, a hydro-mechanical grease interceptor 10 includes a tank 12 having four side walls 14 and a bottom wall 16. The tank 12 includes an effluent inlet 18 in one side wall 14 and an outlet 20 in another side wall. A baffle 22 located inward of the inlet 18 divides the tank 12 into an inlet chamber 24 and separation chamber 26. Effluent flows into the tank 12 through the inlet 18 and enters the inlet chamber 24. The effluent then passes under the baffle 22 into the separation chamber 26, where an elevated tray 28 supports a submersible pump 30. The pump 30 is connected to an evacuation hose 32 which may pass through one of the side walls 14 to a standard reclaim tank or other means of storing the grease for disposal.

A timer controls the operation of the pump 30 at programmed intervals. When the pump 30 is activated, it draws in grease that has risen to the top of the effluent in the tank 12, and pumps the grease out through the evacuation hose 32. The water that has settled below the grease flows into the outlet chamber 34 and is forced up through the chamber 34 into the outlet 20. The grease interceptor 10 thereby acts automatically in a timed sequence to separate the grease from the water flowing in to the grease interceptor and pumps the grease out through the evacuation hose 32 while allowing the clarified water to flow out through the outlet 20. The pump, tray, timer, evacuation hose, and reclaim tank may collectively be referred to as the grease removal device, for use in the grease interceptor.

Figure 2B:
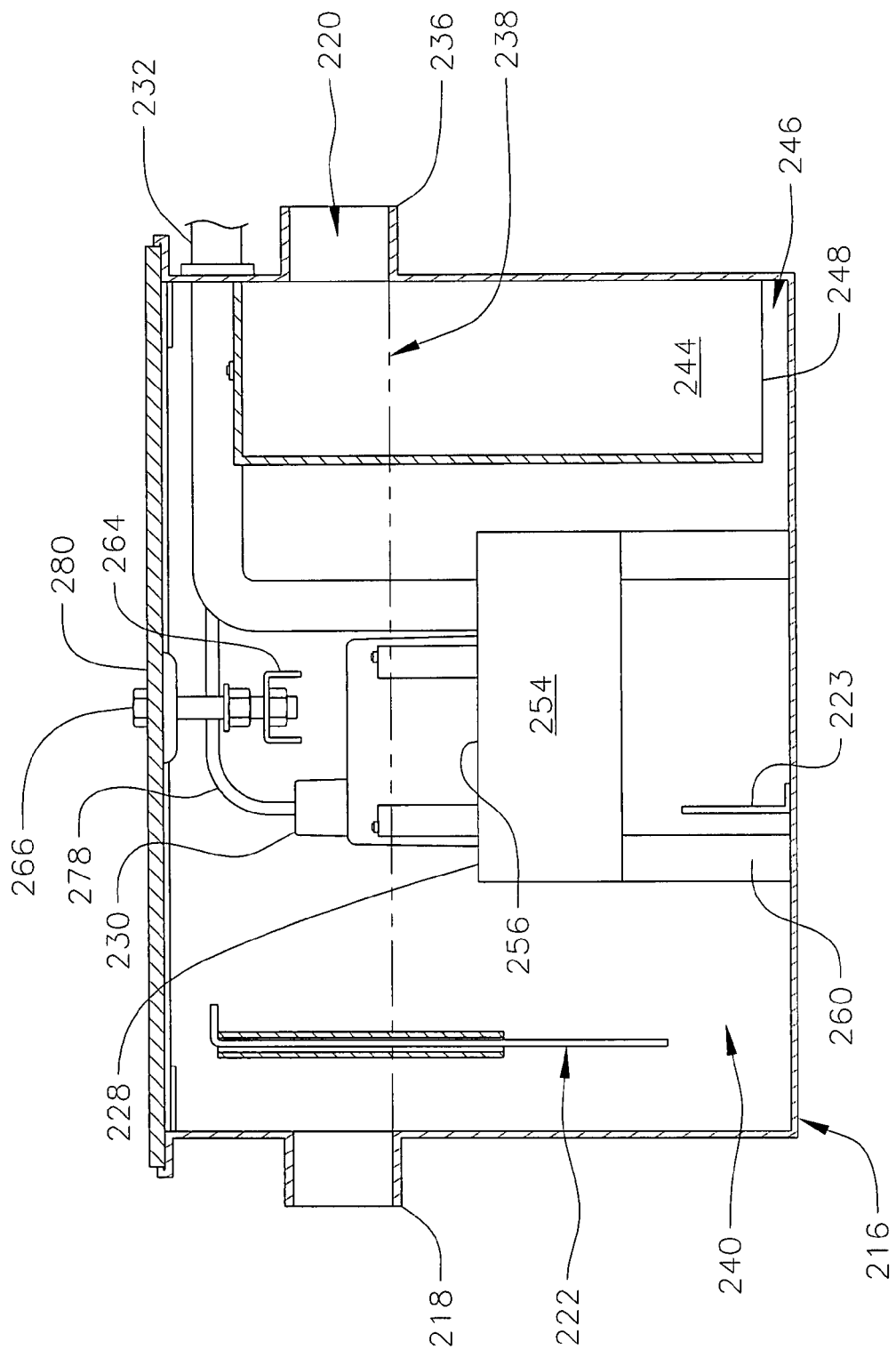

Referring to FIGS. 2a-b, a grease interceptor 210 according to an exemplary embodiment of the invention includes an inlet 218 and outlet 220. In this embodiment, the inlet 218 and outlet 220 are at approximately the same height H from the bottom wall 216, although the heights of the inlet and outlet may vary in other embodiments. A lower edge 236 of the outlet 220 defines the static level 238 of the tank 212. When water rises up to this static level 238, it flows out through the outlet 220, preventing the water level from rising any higher than the static level 238.

The effluent entering the tank 212 may be a combination of water, fats, oil, grease, and,or other similar waste (referred to herein as "FOG" or simply "grease"). A flow controller (not shown) upstream of the tank controls the rate of flow of the effluent into the tank. The effluent first enters the tank 212 through the inlet 218 into the inlet chamber 224, where it is contained by the baffle 222. A flow passage or opening 240 is formed between the bottom edge 242 of the baffle 222 and the bottom wall 216 of the tank 212. This flow passage 240 could be any suitable opening or hole beneath or near the bottom of the baffle 222. The baffle 222 interrupts the incoming flow and forces the effluent to flow down through the flow passage 240 into the separation chamber 226 on the other side of the baffle 222. The effluent then rises into the separation chamber 226. Because the fats, oil, and grease are lighter in density than the water, they rise to the top while the water remains below. The baffle 222 facilitates the stratification of the grease and water in the separation chamber 226 by shielding the separation chamber 226 from the incoming flow through the inlet 218. The incoming flow enters the inlet chamber 224 without disrupting the rising grease in the separation chamber 226. The baffle 222 is removable for cleaning and maintenance of the tank 212.

A second baffle 223 is positioned on the bottom wall 216 of the tank 212 between the first baffle 222 and the outlet 220. The second baffle 223 further interrupts the incoming flow and forces the effluent to rise over the second baffle 223 instead of flowing directly to the outlet 220.

The water at the bottom of the separation chamber 226 flows into the outlet chamber 234 defined by an outlet box or trap leg 244. The trap leg 244 encloses the outlet 220. The trap leg 244 forms a flow passage or opening 246 between the bottom edge 248 of the trap leg 244 and the bottom wall 216 of the tank 212. The clarified water flows through this flow passage 246 into the outlet chamber 234 and through the outlet 220. The water is forced upwards through the trap leg 244 into the outlet 220 by the water pressure in the tank 212.

In one embodiment, the grease interceptor 210 meets the Plumbing and Drainage Institute standard G101, and the American Society of Mechanical Engineers standard A112.14.3. When the grease interceptor 210 is operating at or below its rated grease storage capacity (measured in pounds of grease), less than 10% of the fat, oil, and grease that enter the tank 212 with the water flow out with the water through the outlet 220. For example, a unit rated for a 15 gallon per minute flow rate retains a minimum of 30 pounds of grease inside the tank without passing more than 10% of the grease through the outlet.

The fat, oil, and grease remaining in the tank 212 are pumped out of the tank by the submersible pump 230. The pump 230 includes a pump inlet 250 below the pump outlet 252. The pump outlet 252 is coupled to the evacuation hose 232, which carries the fat, oil, and grease out of the tank 212. The pump 230 is submerged inside the separation chamber 226 of the tank 212. The effluent flowing into the tank 212 surrounds the pump 230 as it fills the separation chamber 226. The pump should therefore be capable of operating while submerged in the effluent. In the embodiment shown, the pump 230 is a standard commercially-available sump pump.

In the illustrated embodiment, the pump is supported by an elevated tray 228 which is also submerged in the effluent inside the separation chamber 226. The tray 228 includes a base 258 and a perimeter wall or fence 254 with a top edge 256. The perimeter wall 254 extends around the base 258 of the tray 228, and the pump 230 rests on the base 258 inside the perimeter wall 254. The base 258 of the tray 228 is elevated by four legs 260. The base and perimeter wall may be watertight.

The height of the legs 260 depends on the physical characteristics of the grease interceptor 210. The tray 258 is used to position the pump 230 at the appropriate level to pump out the desired amount of effluent inside the separation chamber 226. The pump inlet 250 is located within the tray 228 at a level below the tank outlet 220. In the embodiment shown, the pump inlet 250 rests on or near the base 258 of the tray 228. When the pump is activated, it will take in all of the effluent in the tray 228 as well as the effluent at or above the top edge 256 of the perimeter wall 254. Accordingly, the level at which the base 258 is positioned determines how much effluent the pump will draw in. The height of the legs 260 can be adjusted to position the base 258 at the desired level within the separation chamber. In the embodiment shown, the legs 260 are sized to position the top edge 256 of the perimeter wall 254 approximately 2 inches below the static level 238. The perimeter wall 254 is approximately 2 inches in height, thus positioning the pump inlet 250 approximately four inches below the static level 238. When the pump 230 is activated, the pump 230 will draw in the top two inches of effluent in the separation chamber 226 as well as the effluent in the tray 228.

The pump outlet 252 is above the pump inlet 250 and is connected to the evacuation hose 232. The effluent drawn into the pump 230 passes through the pump outlet 252 into the hose 232, and passes through the hose 232 out of the tank 212. The hose 232 passes out of the tank through a side wall 214 through a watertight hose fitting 262.

In one embodiment, the grease interceptor 210 also includes a center securing bar 264 extending across the tank 212 above the inlet 218 and outlet 220. This bar 264 has an opening for receiving a bolt 266 or other fastener for attaching a lid or cover 280 to the tank 212. The tank 212 may also include receiving holes 274 near the top of the tank to receive extension pieces or other external attachments to the tank 212. These holes 274 can also be used to secure the cover or lid for the tank 212.

Electrical cables 278 providing power to the pump 230 pass through a watertight electrical fitting 268 in a side wall 214 of the tank. The cables 278 can then pass through the tank to connect to the pump 230. The side walls 214 and bottom wall 216 of the tank 212 can be steel coated with epoxy, or any other suitable material.

Figure 3:
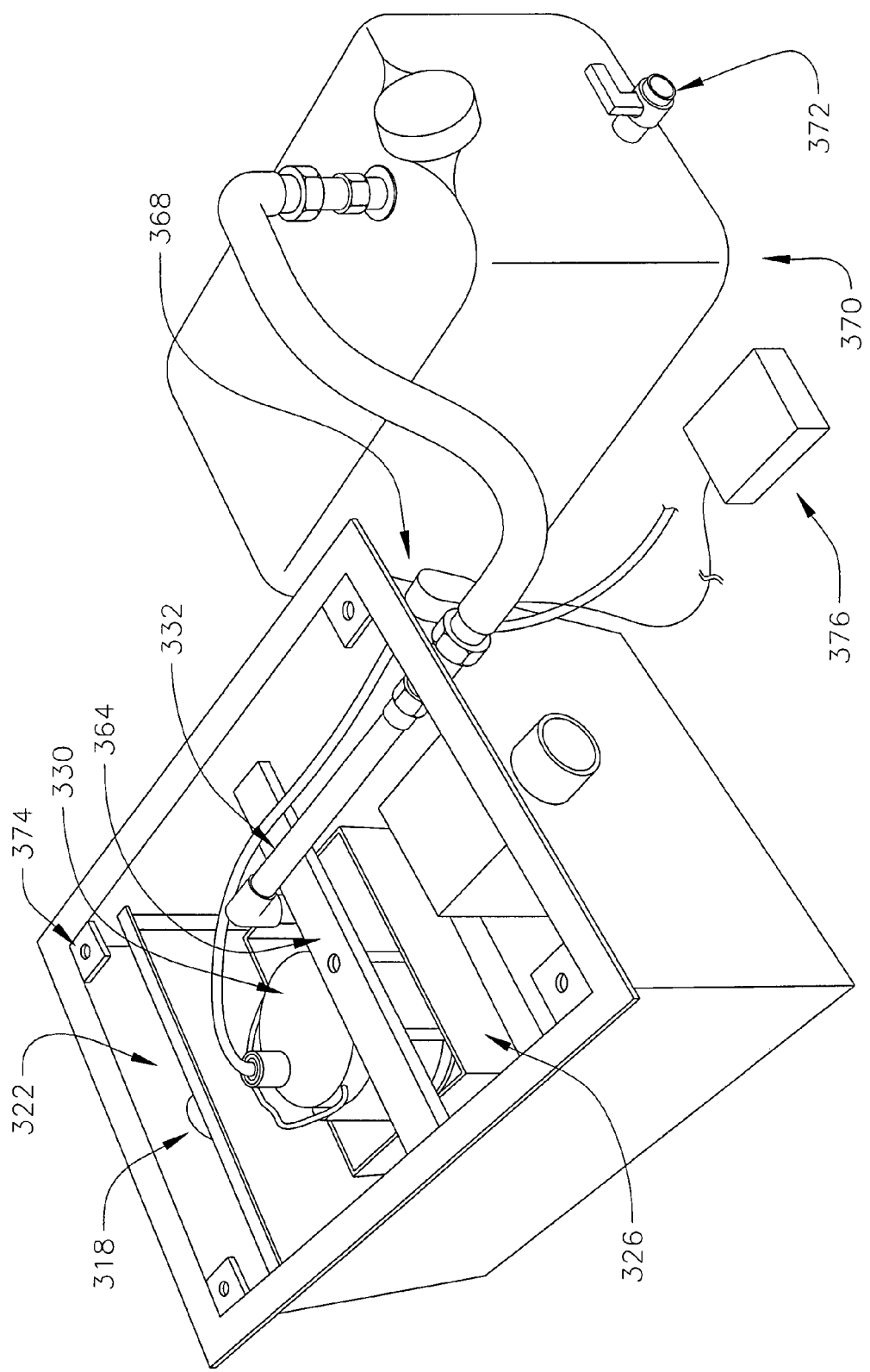
FIG. 3 is a perspective view of a hydro-mechanical grease interceptor according to an exemplary embodiment of the invention.

Referring to FIG. 3, a hydro-mechanical grease interceptor-according to an exemplary embodiment of the invention includes a reclaim tank 370 connected to an evacuation hose 332. Effluent pumped through the hose 332 by a pump 330 enters the reclaim tank 370. If water is drawn into the pump along with the grease, the water settles inside the reclaim tank 370 below the grease. A water draw-off valve 372 at or near the bottom of the reclaim tank 370 allows the clarified water to be drained from the reclaim tank 370. The fat, oil, and grease remaining inside the reclaim tank 370 can be safely disposed of or the entire tank can be discarded according to health and sanitation codes.

A programmable timer 376 controls the operation of the pump 330. In the embodiment shown, the timer 376 is electrically coupled to the pump 330 by wires or cables that pass through a watertight electrical fitting 368. The timer 376 can be programmed to activate the pump 330 at desired intervals, ranging from approximately 1 day to 99 days. In another embodiment, element 376 may be a grease-sensing device, which may have a grease-sensing probe (not shown) to activate the pump in response to a buildup of grease.

When the grease-sensing device or timer 376 activates the pump 330, the pump 330 draws in effluent above the level of the pump inlet. In the embodiment of FIGS. 2a-b, the pump inlet 250 is positioned approximately at the level of the base 258, which is approximately two inches below the top edge 256, which in turn is approximately 2 inches below the static level 238. Thus, when the pump is activated, it draws in the top two inches of effluent in the tank 212 and the effluent in the tray. These heights may be varied in other embodiments according to the size of the tank 212, flow rate of effluent, flow capacity of the pump, amount of fats and greases, and other factors.

When the pump 230 is activated, it draws effluent into the tray 228 and then upward into the pump inlet 250. The effluent in the separation chamber 226 flows over the top edge 256 of the perimeter wall 254 into the tray 228, creating a cascade or waterfall effect into the tray, before the effluent is drawn upward into the pump. This cascading motion disturbs the effluent and breaks apart any crust that may have formed on the top of the effluent. The effluent is thus churned before it is drawn upward into the pump, so it is less likely to clog the pump 230 or the evacuation hose 232 as it flows through. The perimeter wall 254 may have a sharp upper edge 256 to facilitate this churning and breaking apart of the effluent as it falls into the tray.

The timer can be programmed to activate the pump at set intervals based on the user's profile of grease generation. For example, based on the amount of grease generated by the user and the size of the tank, the user may set the timer to operate the pump once per day, or once per week, or at any other suitable interval. The user can use empirical or other methods to determine the amount of grease in the effluent, the rate of effluent flow, and the resulting rate of grease generation. The user can create a graphical representation of this data to create a grease generation profile, which can then be used to select the programmed interval for the timer. Alternatively, the timer can be used as a manual control. An operator can manually turn on the timer to activate the pump, and can then either run the pump for a set period of time or manually turn it off.

When the user programs a timed interval or uses the timer manually, it is desirable to operate the pump to draw out some water as well as fat, oil, and grease. The pump will take in the effluent above the pump inlet; if this includes both water and grease, then the user has likely pumped out all of the grease in the tank. This is because the water settles to the bottom of the tank, below the grease, so when the pump draws in water as well as grease, it has likely drawn in all of the grease above the water. If only grease is drawn out, it is possible that the grease level extends below the pump inlet, so that some grease remains in the tank.

Figure 4:
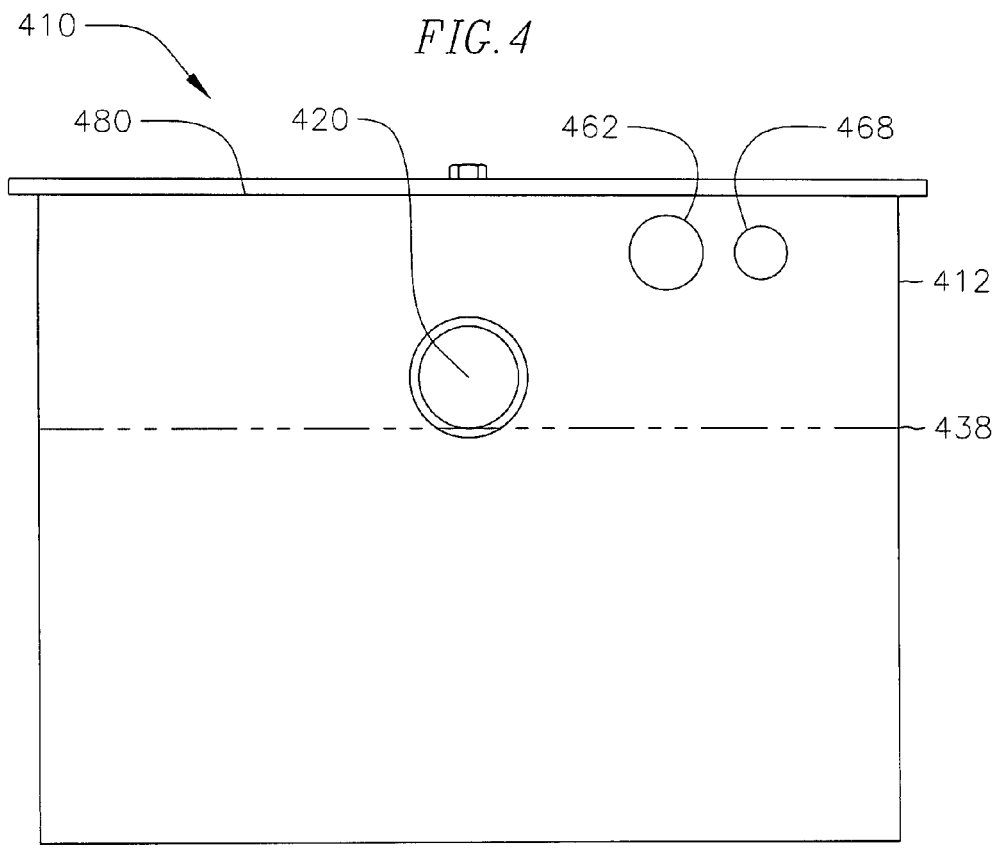
FIG. 4 is a rear elevational view of a hydro-mechanical grease interceptor according to an exemplary embodiment of the invention.

Referring to FIG. 4, a grease interceptor 410 according to an exemplary embodiment of the invention includes tank 412 with a removable lid or cover 480. The cover 480 closes the open top of the tank 412. The cover 480 can be attached to a center securing bar inside the tank 412 and/or to receiving holes at the top of the tank 412, and/or in any other suitable way. The cover 480 seals the effluent inside the tank 412 and prevents leaks and undesirable sights and smells. The lower edge of the outlet 420 defines the static level 438 in the tank 412.

Figure 5:
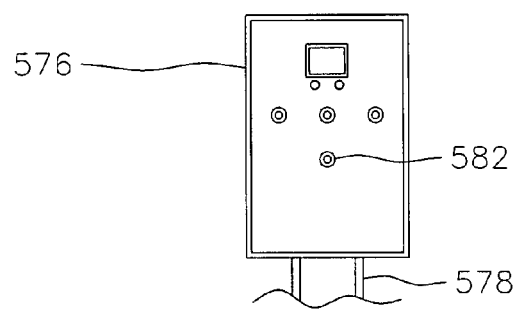
FIG. 5 is a front view of a timer for use with a hydro-mechanical grease interceptor according to an exemplary embodiment of the invention.

Referring to FIG. 5, a timer 576 may be a specially programmed timer specifically programmed for timed grease evacuation, or it may be any suitable commercially available timer. Optionally, the timer 576 has manual controls 582 for manual operation of the pump. Electrical cables 578 connect the timer to the pump.

Figure 6:
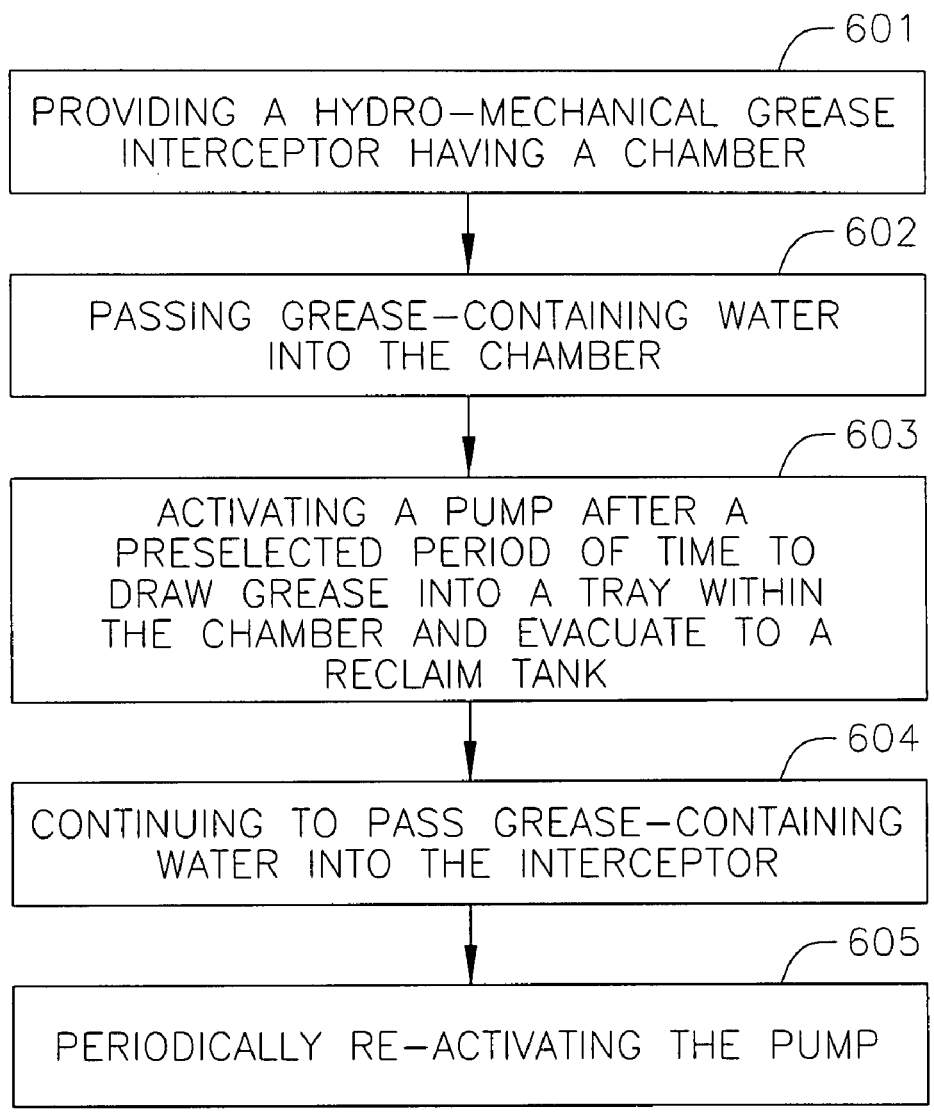
FIG. 6 is a flow chart illustrating a method of operating a hydro-mechanical grease interceptor with a grease removal device according to an exemplary embodiment of the invention.

Referring to FIG. 6, a method of operating a hydro-mechanical grease interceptor with a grease removal device is provided according to an exemplary embodiment of the invention. The method includes providing a hydro-mechanical grease interceptor having a chamber 601. The method then includes passing grease-containing water into the chamber 602. The method then includes activating a pump after a preselected period of time to draw grease into a tray within the chamber, and to evacuate the grease to a reclaim tank 603. The method then includes continuing to pass grease-containing water into the interceptor 604 and periodically re-activating the pump 605.

For periodic maintenance of the grease interceptor, the method may also include removing the pump from the elevated tray and positioning the pump at the bottom of the interceptor, then activating it to facilitate the removal of solids and debris collected over time in the tank. The method may also include using a grease generation profile to select the preselected period of time.

Although limited embodiments of the hydro-mechanical grease interceptor have been specifically described and illustrated herein, many modifications and variations will be apparent to those skilled in the art. Accordingly, it is to be understood that the hydro-mechanical grease interceptor constructed according to principles of this invention may be embodied other than as specifically described herein. The invention is also defined in the following claims.

What is claimed is:

1. A hydro-mechanical grease interceptor comprising:
a tank having a tank inlet and a tank outlet;
a tray positioned inside the tank; and
a pump located inside the tank, the pump having a pump inlet and a pump outlet, wherein the pump inlet is located within the tray at a level below the tank outlet.

2. The hydro-mechanical grease interceptor of claim 1, further comprising a timer coupled to the pump to control operation of the pump.

3. The hydro-mechanical grease interceptor of claim 2, wherein the timer is programmable to activate the pump at an interval of between 1 day and 99 days.

4. The hydro-mechanical grease interceptor of claim 1, wherein the pump inlet is located below the pump outlet.

5. The hydro-mechanical grease interceptor of claim 4, wherein the tank has an open top closed by a removable cover.

6. The hydro-mechanical grease interceptor of claim 1, wherein the tray comprises a perimeter wall having a top edge, and wherein the top edge is below the tank outlet, and wherein the pump inlet is below the top edge.

7. The hydro-mechanical grease interceptor of claim 6, wherein the perimeter wall has a height of approximately 2 inches.

8. The hydro-mechanical grease interceptor of claim 1, wherein the pump outlet is coupled to an evacuation hose.

9. The hydro-mechanical grease interceptor of claim 8, wherein the evacuation hose is coupled to a reclaim tank.

10. The hydro-mechanical grease interceptor of claim 1, wherein the pump inlet is approximately 2 inches below the tank outlet.

11. The hydro-mechanical grease interceptor of claim 1, further comprising a baffle positioned inside the tank between the tank inlet and the tank outlet, and a flow passage below the baffle.

12. A timed grease evacuation system comprising:
    a tank comprising a tank inlet and a tank outlet;
    a baffle positioned in the tank between the tank inlet and the tank outlet;
    a flow passage below the baffle;
    an elevated tray positioned in the tank between the baffle and the tank outlet;
    a pump supported by the elevated tray, the pump having a pump inlet below a pump outlet, wherein the pump inlet is positioned by the elevated tray below the tank outlet;
    a timer coupled to the pump and programmable to operate the pump at timed intervals;
    a reclaim tank; and
    an evacuation hose connecting the reclaim tank to the pump outlet.

13. The timed grease evacuation system of claim 12, wherein the pump inlet is approximately four inches below the tank outlet.

14. The timed grease evacuation system of claim 12, wherein the elevated tray further comprises a perimeter wall having a height of approximately 2 inches.

15. The timed grease evacuation system of claim 14, wherein a top edge of the perimeter wall is approximately 2 inches below the tank outlet.

16. The timed grease evacuation system of claim 12, wherein the timed intervals are between approximately 1 day and approximately 99 days.

17. A hydro-mechanical grease interceptor for collecting grease, comprising:
    an inlet chamber;
    a separation chamber separated from the inlet chamber by a baffle;
    an elevated tray positioned in the separation chamber;
    a pump supported by the elevated tray; and
    a timer programmable to operate the pump at programmed intervals,
    wherein the pump is positionable in the elevated tray to draw such grease upward from the elevated tray.

18. The hydro-mechanical grease interceptor of claim 17, further comprising an outlet chamber separated from the separation chamber by a second baffle.

19. A method of evacuating grease from a hydro-mechanical grease interceptor, comprising:
    providing a hydro-mechanical grease interceptor having a chamber;
    passing grease-containing water into the chamber;
    activating a pump after a preselected period of time to draw grease into a tray within the chamber and to evacuate the grease to a reclaim tank;
    continuing to pass grease-containing water into the interceptor; and
    periodically re-activating the pump.

20. The method of claim 19, further comprising using a grease generation profile to select the preselected period of time.

* * * * *